Fig.1

Patented Feb. 7, 1939

2,146,351

UNITED STATES PATENT OFFICE 2,146,351

INTERNAL COMBUSTION ENGINE

François Rochefort, Courbevoie, France

Application October 23, 1935, Serial No. 46,392
In France October 23, 1934

3 Claims. (Cl. 123—51)

There exist four stroke cycle engines the admitted charge of which is variable in accordance with atmospheric pressure, that is to say which are underfed at the ground level (aviation engines intended for flying at high altitudes). In these engines, the closing of the intake valve is delayed, in order to keep in the cylinders only the amount of carburetted gas that can be accepted in accordance with the ratio of compression of the engine. As the air plane climbs, the closure of the intake valve is caused to take place earlier and earlier, by means of a suitable control, so as to keep the actual pressure of compression substantially constant. The intake valve may also be caused to close in advance on the end of the piston stroke.

Experience has taught that these solutions do not permit of obtaining a proper operation of the engine, for several reasons, the chief of which are the following:

(1) The perturbation due to the reduction of the mean rate of flow of the gases through the intake conduits, resulting from the back-flow from the cylinder or the angular reduction of the intake period;

(2) The very small sections of flow and the excessive wiredrawing through the intake valves involve too variable an efficiency of the adjustment of the amount of mixture absorbed for each stroke as a function of the speed of revolution of the engine; experience teaches that it is not possible to stabilize the ratio of compression for relatively low variations of speed;

(3) The return of the valves to their seats under the action of springs does not ensure a sufficient accuracy of adjustment for high speeds of revolution of the engine.

There exist also two stroke engines in which the scavenging and the filling of the cylinder are effected through two independent rows of ports, the feed pressure of the cylinder being adjusted at the beginning of the compression stroke. But in these engines, the volume of air or of carburetted mixture that is admitted is substantially equal to the maximum volume generated by the piston when moving in the cylinder; therefore, in this case, the ratio of expansion is substantially equal to the ratio of compression. Furthermore, there always exist detrimental recesses at the time of expansion, constituted by the hollow spaces of the ports themselves, between the inner wall of the cylinder and the closure organ or organs.

The present invention concerns a two stroke cycle internal combustion engine with opposed pistons fitted in a common cylinder, having cylinders in line, characterized in that the cylinder is provided, besides the intake and exhaust ports, with supplementary ports, controlled by a valve member which, during the first part of the admission or compression stroke, connects the cylinder with a main or reservoir into which air or a carburetted mixture is discharged, in such manner that when these supplementary ports are closed the charge of air or of mixture contained in the cylinder is of a predetermined density, independent of the amount of air or mixture introduced into the cylinder at the beginning of this admission or compression stroke.

In the case of a multi-cylinder engine, this regulating main or reservoir is common to the different cylinders.

The engine thus works under underfed conditions.

The regulating main or reservoir may also be fully separated from the atmosphere or be fed through a volumetric compressor driven at a speed in a constant ratio with that of the engine, in such manner as to complete the charge. In this case, the engine works under normal feeding conditions.

The regulating main or reservoir may also be fully separated from the atmosphere and be fed with air or mixture through a volumetric compressor driven at a speed in a constant ratio with that of the engine, with a pressure necessary for supercharging the engine.

The preferred embodiment of the present invention is hereinafter described, with reference to the accompanying drawings, taken merely by way of example, and in which.

Figure 1:
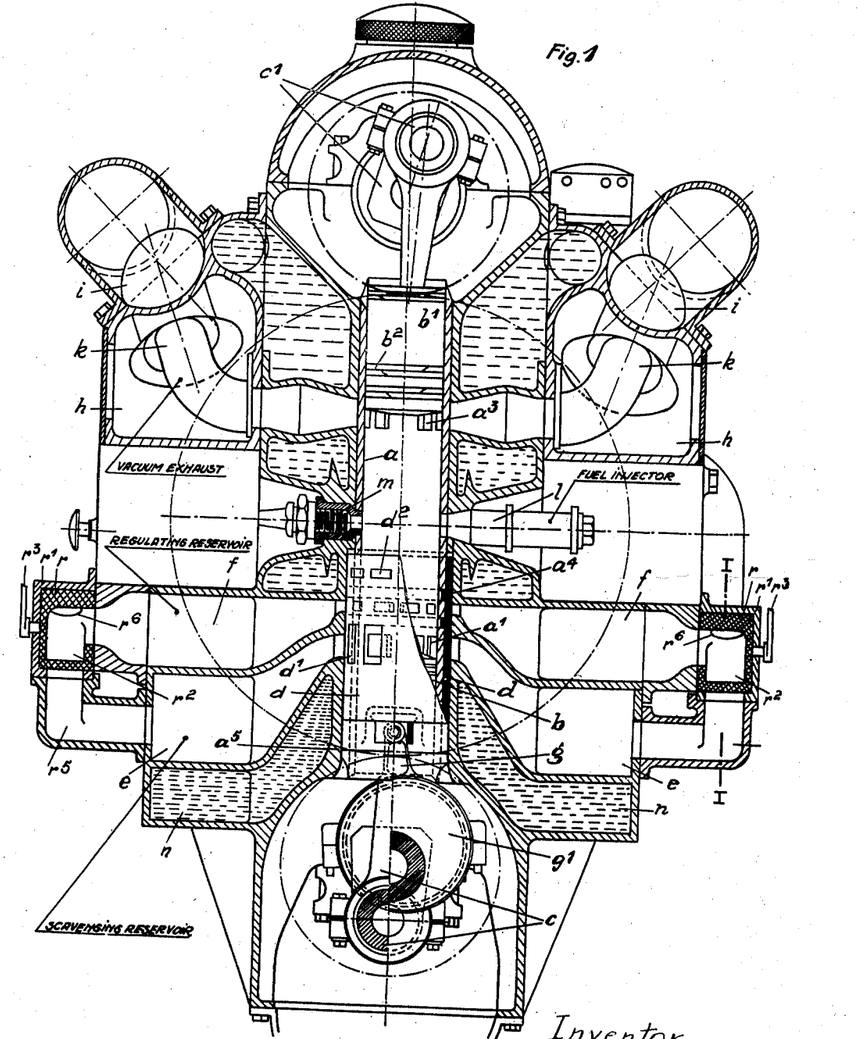
Fig. 1 is a longitudinal axial section of an internal combustion engine, of the two stroke cycle type, having opposed parallel pistons and cylinders, provided with a valve member consisting of a cylindrical slide-valve, positively driven, in both directions, with a reciprocating rectilinear movement through a linkage comprising a connecting rod and crank or eccentric. This engine is designed to be underfed, with a prolonged expansion phase.

As shown by Fig. 1, the two opposed cylinders of the engine are constituted by an elongated stationary sleeve $a$ in which the opposed pistons $b$ and $b^1$ are movable, respectively. These pistons drive the corresponding crankshafts $c$ and $c^1$ which turn in predetermined order chosen in accordance with the working conditions of the engine, said crankshafts being positively interconnected through gears (which are not shown in the drawings).

Piston $b$, provided with packing rings $b^2$, controls, through ports $a^1$, provided in the stationary cylindrical sleeve $a$, the beginning and the end of the scavenging, and also the admission of fresh air, and it closes, in the course of its upward stroke, the ports $a^2$ also provided in this sleeve, along the periphery thereof.

Piston $b^1$, which is also provided with packing rings $b^2$, controls the opening and the closing of the exhaust ports $a^3$ provided in sleeve $a$.

A cylindrical slide-valve $d$ is disposed concentrically to stationary sleeve $a$ and it fits accurately along the external surface of the lower part of said sleeve $a$, and also in the cylinder base $a^5$.

Ports $d^1$ and $d^2$, provided in slide-valve $d$, connect, at the proper time, the inside of the cylinder-sleeve with the scavenging reservoir $e$, first, and then with the regulating reservoir $f$, respectively.

Packing rings $a^4$, disposed in recesses provided in stationary sleeve $a$ ensure fluid tightness above and below ports $a^2$.

Slide valve $d$ is driven through a connecting rod $g$ and a crank or eccentric $g^1$, disposed in a suitable angular position with respect to crank shaft $c$, for ensuring distribution.

Cylinders $a$ are cooled by the circulation of water through jacket $n$.

Figures 2, 3:
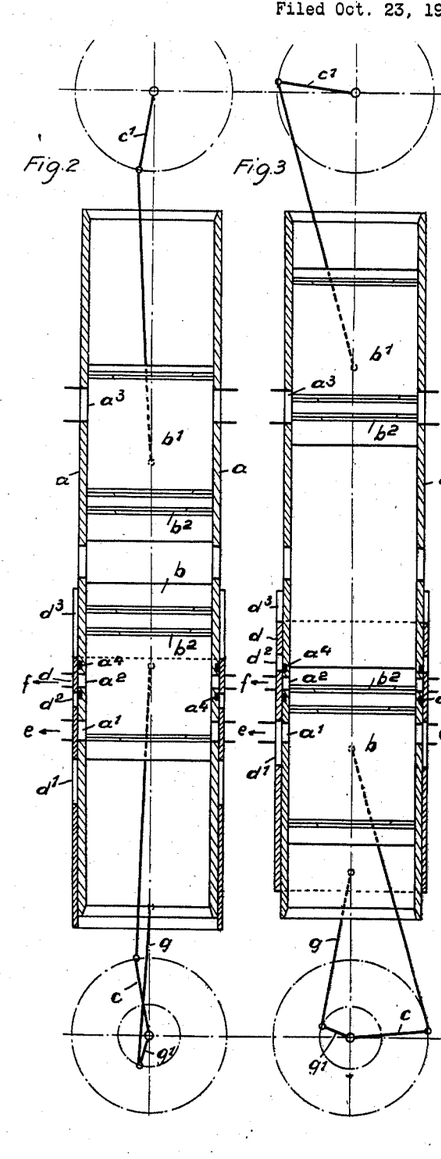

Fig. 2 shows the relative position of the two pistons $b$ and $b^1$ at the end of the compression stroke, that is to say, account being taken of the angular dephasing of cranks $c$ and $c^1$, in the position in which the two pistons are at the minimum distance from each other.

Fig. 3 shows the engine during the expansion stroke, when the last packing ring $b^2$ of scavenging piston $b$ is just about to uncover the ports $a^3$ corresponding to the regulating reservoir. At this time, the expanding gases, still at a high pressure, cannot escape through ports $a^2$, which are closed by slide-valve $d$; fluidtightness is ensured through the packing rings $a^4$ of sleeve $a$.

Figure 4:
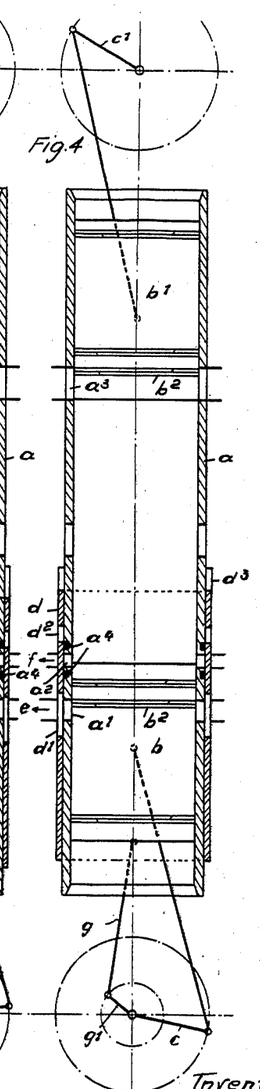

Fig. 4 shows the engine still during the expansion stroke; Piston $b^1$ is about to uncover the exhaust ports $a^3$. Piston $b$ has uncovered ports $a^2$, which are still closed by slide-valve $d$.

Figures 5, 6, 7:
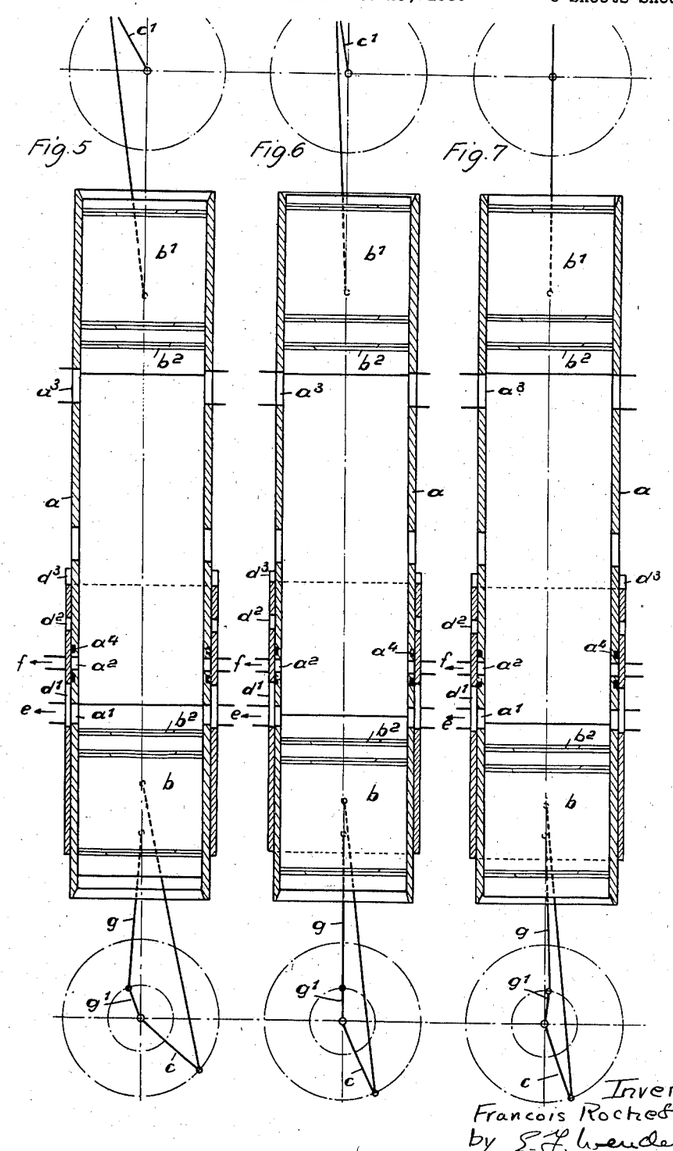

Fig. 5 shows the engine during the exhaust period; Ports $a^2$ are still closed by slide-valve $d$; Piston $b$ is about to uncover the scavenging ports $a^1$.

Fig. 6 shows the engine at the end of the exhaust period; ports $a^2$ are still covered by slide-valve $d$; piston $b$ has uncovered the scavenging ports $a^1$; ports $d^1$ of slide-valve $d$ permit communication between the inside of the cylinder and the scavenging reservoir $e$, which is fed with fresh air at a low pressure.

Fig. 7 shows the engine near the end of the expansion, during the scavenging period; ports $a^2$ are still closed. Exhaust piston $b^1$ is at the end of its stroke.

Figure 8:
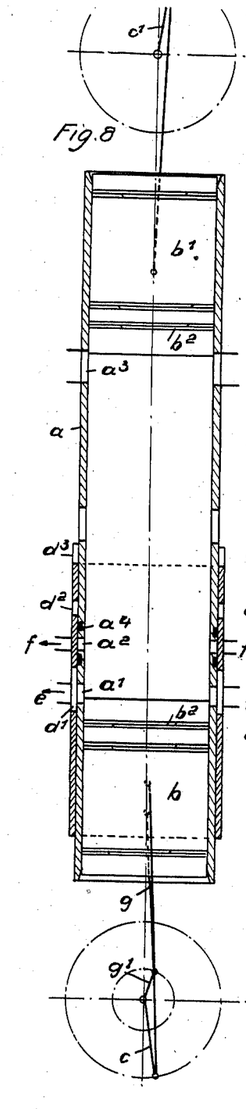

Fig. 8 shows the engine at the end of the expansion and during the scavenging period; the two pistons are now at the maximum distance from each other, account being taken of the angular dephasing between cranks $c$ and $c^1$.

Figure 9:
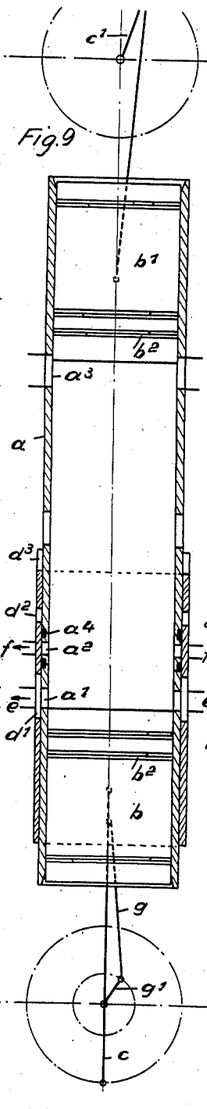

Fig. 9 shows the engine during the scavenging period, when fresh air is being admitted into the cylinder. Ports $a^2$ are still closed by the slide-valve. Scavenging piston $b$ is at the end of its stroke.

Figure 10:
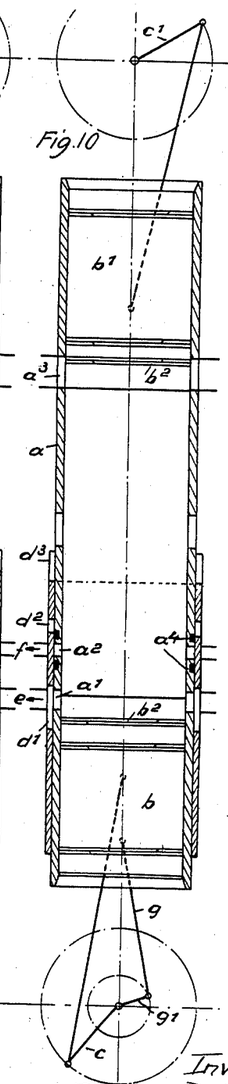

Fig. 10 shows the engine still in the period of admission of fresh air; piston $b^1$ has just closed the exhaust ports $a^3$; ports $a^2$ are still closed by slide-valve $d$. Both pistons $b$ and $b^1$ are moving back toward the compression chamber.

Figure 11:
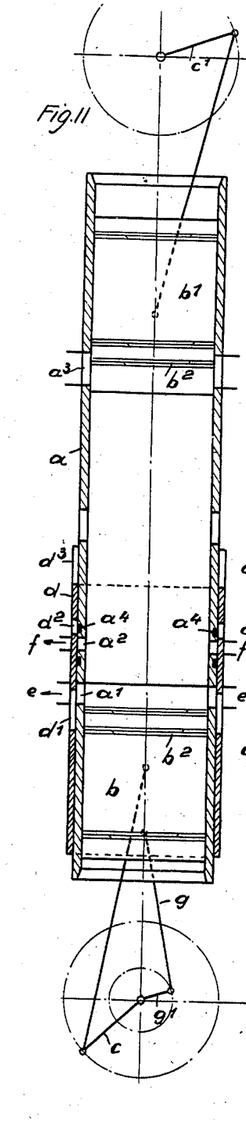

Fig. 11 shows the engine at the end of the period of admission of fresh air; the ports $a^1$ for scavenging and admission of fresh air have just been closed by piston $b$. When the upper part of piston $b$ has sufficiently covered the upper edge of ports $a^1$ in such manner as to avoid any leakage through these ports, slide valve $d$ (which is moving in a downward direction and the linear velocity of which is nearly maximum) suddenly establishes, through ports $a^2$ and $d^2$, a communication between the inside of the cylinder and the regulating reservoir $f$.

Figure 12:
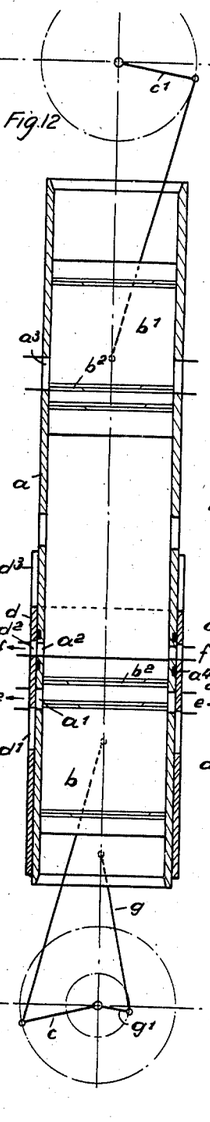

Fig. 12 shows the engine when the charge introduced into the cylinder is being regulated through this communication with reservoir $f$. Both pistons are still moving toward each other. Cylindrical slide-valve $d$ is still moving in a downward direction. Ports $a^2$ and $d^2$ are fully opened, that is to say establish full communication between the inside of the cylinder and reservoir $f$.

Figure 13:
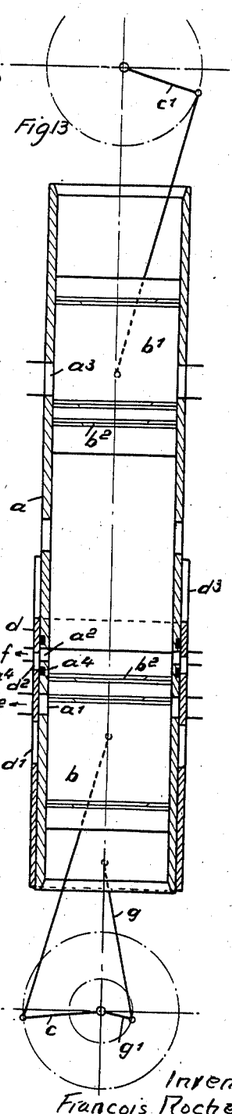

Fig. 13 shows the engine at the beginning of the compression stroke, just when the upper edge of piston $b$ moves past the upper edge of ports $a^2$. At this time, the volume between the ends of pistons $b$ and $b^1$ is at most equal to one half of the maximum volume that may exist between said pistons.

Figures 1A, 1B, 1C, 1D, 14:
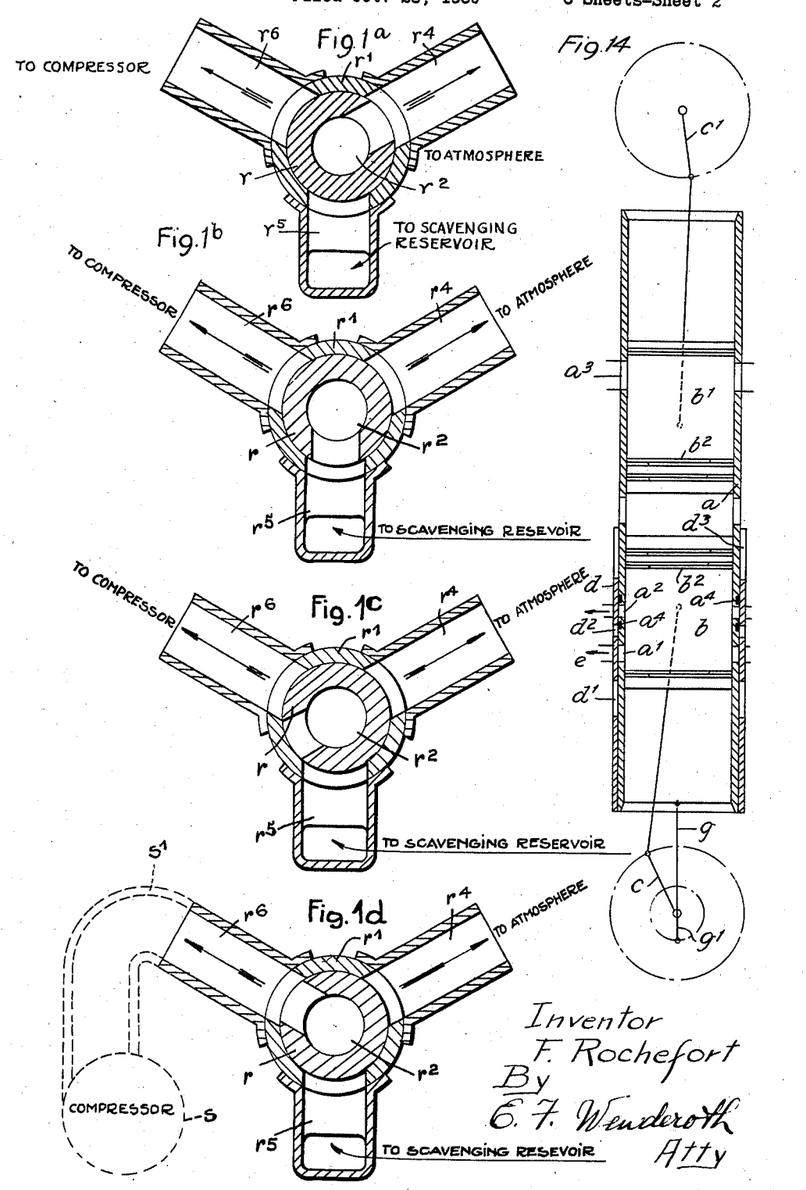
Figs. 1a, 1b, 1c, and 1d are sectional views on the line I—I of Fig. 1, and corresponding to various positions of a rotary valve member associated with the engine.
Figs. 2 to 14 inclusive are diagrammatical views, in axial longitudinal section, showing different relative positions of the pistons and of the slide-valve, corresponding to one cycle operation of the engine.

Fig. 14 shows the position of slide-valve $d$ at the end of its downward stroke.

It will be observed, by considering the displacements of slide-valve $d$ in Figs. 2 to 14, that for any position whatever the wall of this slide-valve prevents any communication, along its slide-way $d^3$, between the regulating collector or reservoir $f$ and the scavenging reservoir $e$, so as to avoid any leakage of the charge of reservoir $f$.

The clearance space of the compression chamber, shown in Fig. 2, is calculated and established by starting from the half volume shown in Fig. 13, that is to say the volume existing between the pistons in the cylinder when the ports $a^2$ are being closed by piston $b$.

In the case of engines adapted to run at very high speeds of revolution and of small cylinder volume, the point of closing of ports $a^2$ may be chosen to coincide with a volume between the pistons reduced to one half of the maximum volume that can exist between these pistons.

In the case of engines adapted to run at slow speeds and having a very large cylinder volume, the closing of ports $a^2$ may be slightly delayed until the volume between the pistons is reduced to one third of the maximum volume that can exist between these pistons. For engines having cylinder volumes intermediate between these two extreme cases, one might choose intermediate adjustments between the limits above set forth, taking into account the conditions of utilization of the engine and the nature of the fuel that is employed.

In the two stroke engine that has been considered by way of example, the scavenging of the burnt gases and the normal feed of fresh air to the cylinder are ensured through a stream of fresh air at very low pressure, supplied by a pump fan, which is driven by the engine itself, with a free wheel coupling device (that is to say a transmission device operative in a single direction of rotation). The pump-fan is preferably of the helical type so that it can be driven by the stream of scavenging air at a speed equal to or higher than that at which it is driven by the engine. Therefore it absorbs an amount of power which is the smaller as the resistance to its discharge is smaller, with a substantially uniform rate of flow. This pump-fan must have, under normal conditions of working, a rate of feed sufficient for ensuring: (1) the full scavenging of the burnt gases and also the normal feed of fresh air to the cylinder, and (2) a rapid and continuous stream of air through the exhaust conduits.

This pump-fan is disposed in such manner as to be able to feed air under pressure, through two mains $h$, to Venturi tubes $i$ and also to two scavenging and air feed mains, disposed on either side of the central part of the engine, respectively. At the inlet of each of these mains $e$, there is provided a movable shutter, valve or the equivalent (not shown) intended to reduce the feed to these mains in accordance with the adjustment of the pressure in the regulating reservoir $f$, when the working conditions are being modified.

The exhaust of the burnt gases, after opening of the exhaust ports, is effected through convergent-divergent expansion nozzles $k$, disposed symmetrically on either side of the cylinders and diametrally opposed.

These nozzles $k$ are each arranged in a Venturi tube $i$ in which a rapid stream of air is maintained, in such manner as to constitute, on either side of the cylinder, an ejector which, at the time of the sudden expansion of the burnt gases, when the exhaust ports are being opened, serves to create a sudden acceleration of the air stream circulating through the Venturi tubes $i$, around the expansion nozzles $k$.

The action of the stream of fresh air thus maintained around the expansion nozzles for the exhaust gases has for its effect to prolong and to maintain the period of suction produced in the cylinder by the sudden expansion of the burnt gases, still under pressure and at a high temperature, at the beginning of the opening of the exhaust ports, and to produce a drop of temperature of the burnt gases that are evacuated.

In an engine including a plurality of cylinders, all the exhaust ejectors are placed in communication, on either side of the group of cylinders, with a common main in which there is maintained a rapid stream which circulates in the direction of flow of the burnt gases. This arrangement of the nozzles makes it possible to avoid a counter-pressure at the exhaust and facilitates the rapid and full evacuation of the burnt gases, and therefore the filling of the cylinders with fresh air supplied at very low pressure.

The feed device is shown at $l$ and the ignition plug at $m$.

This feed device $i$ preferably is a fuel injector nozzle of a conventional type.

Considering the engine working with a constant speed and power, its operation takes place as follows:

The pump-fan maintains the feed of air under pressure to the scavenging mains $e$ and also a high velocity stream of air through the Venturi tubes $i$, around the exhaust nozzles $k$, as above explained.

When the exhaust ports $a^3$ are opened, the burnt gases suddenly expand through the convergent-divergent nozzles $k$. The sudden drop of pressure and temperature, and also the high speed of flow of the gases toward the outside, produce a considerable suction inside the cylinder. This suction is maintained in nozzles $k$, after passage of the burnt gases, owing to the acceleration imparted to the air stream that flows around these nozzles.

When the suction is created in the cylinder, the ports $a^1$ for scavenging and admission of fresh air are suddenly opened by piston $b$. The air under pressure present in the scavenging main or reservoir $e$ flows behind the burnt gases into the cylinder and escapes owing to its dynamic force through the escape nozzles $k$ and the Venturi tubes $i$. This is the scavenging period.

There is therefore produced through the cylinder a stream of fresh air, free and without any definite rate of flow for high charges. The pump-fan of the helical type, driven by means of a free-wheel device cannot prevent or disturb the passage of the mass of air which might be sucked in by the cylinder and the exhaust tubes.

The exhaust piston $b^1$ moves downwardly and suddenly closes the exhaust ports $a^3$. Owing to its dynamic force, the air stream flowing through the scavenging ports $a^1$ keeps filling the cylinder until these ports are closed.

I may obtain in this way, a coefficient of filling at least equal to that obtained with the best four-stroke engines that are not supercharged.

Despite the conditions favorable to a good filling of the cylinders in a high speed engine having a plurality of cylinders, it is impossible to define in a rigorous manner the density of the charge of air or mixture stored up in the various cylinders as the intake ports are closed. This density may vary from one cylinder to the next one within rather wide limits. As a matter of fact, this is the case for all engines having an intake manifold of great length.

The actual pressures of compression are determined by the degree or coefficient of filling of the cylinders. If the differences of filling of the cylinders are considerable, the actual pressures of compression of the respective cylinders shall also vary within wide limits and shall influence to a considerable degree the maximum pressures of combustion and the velocities of combustion and also, consequently, the mean pressures of expansion. The engine shall vibrate due to differences between the torques on the respective crank pins.

By employing, according to the present invention, a regulating reservoir or main common to all the cylinders of the engine, the actual pressures of compression of the respective cylinders are rendered uniform and the volume and density of the gaseous mass that shall work during one cycle of the engine is regulated in an accurate manner.

Without changing in any way the volume of the chamber of compression, it is possible to obtain different conditions of working of the engine, by varying the value of the pressure of the charge of air or of mixture. I may obtain: (A) an underfed engine, as described with reference to the example above described; (B) a normally fed engine, and (C) a supercharged engine.

(A) In the example above considered and described with reference to Figs. 1 to 14 of the drawings (underfed engine) the regulating main $f$ must be constantly maintained at a pressure equal to, or very little different from, the atmospheric pressure. This may be obtained by means of a valve $r$ arranged in such manner as to be able to turn in a fluidtight manner in a cylindrical fixed housing $r^1$ at the end of the regulating main $f$, between the latter and the scavenging air reservoir $e$. The hollow inner space $r^2$ of this valve $r$ is constantly in communication with the regulating main $f$. A hand lever $r^3$ permits of turning the valve $r$ in its housing $r^1$. Conduits $r^4$, $r^5$, $r^6$ open into this cylindrical housing $r^1$. Conduit $r^4$ is in communication with the atmosphere. Conduit $r^5$ is connected with the scavenging air reservoir $e$. Conduit $r^6$ is connected to the discharge end of a small compressor $s$. In the position shown by Figs. 1 and 1a, valve $r$ connects the regulating main $f$ with the atmosphere. In the position shown by Fig. 1b, the regulating main $f$ is in communication with the scavenging air reservoir $e$. In this case, the pressure existing in this main $f$ is very little higher than atmospheric pressure.

Whatever be the degree of charging of the cylinder, the pressure inside said cylinder shall tend to become equal to that existing in the regulating main $f$, during the opening of ports $a^2$ and it will be exactly equal to this pressure when piston $b$ closes ports $a^2$, because the mass of air displaced in one direction or the opposite one shall be small, the cylinder either discharging into the regulating main $f$ a certain amount of air in excess, or receiving an addition of air from said main. In any case, every cylinder shall receive, in the example that is considered, at the time of closing of port $a^2$ a mass of air corresponding to one half of the maximum volume at the end of the expansion period, and, in addition, a volume corresponding to the chamber of combustion, which is measured. The pressure of this gaseous mass shall be exactly equal to the pressure existing in main $f$, the cross section of ports $a^2$ being sufficiently large for permitting this balancing of the pressures in the cylinder and in the main to be established for the highest speed of utilization of the engine.

Considering an engine made according to the present invention, having a ratio of compression equal to 6, this ratio being calculated by supposing that the volume at the beginning of the compression stroke is equal to one half of the maximum volume, then the ratio of expansion is equal to 11.

If the engine is made with a ratio of compression equal to 11, still under the same conditions, the ratio of expansion is equal to 21.

The ratio of compression is established by taking into account the nature of the fuels that are employed and the system of ignition that is chosen, or according to the use for which the engine is intended.

(B) For an engine to be fed under normal conditions, the regulating reservoir or main $f$ is wholly separated from the atmosphere and from the fresh air main $e$ by means of valve $r$ brought to the position shown by Fig. 1c, or it is placed in communication, by means of valve $r$, brought into the position shown by Fig. 1d, with the discharge end $s^1$ of a small volumetric compressor $s$, of variable output, driven with a constant speed ratio with respect to the engine, and preferably by the engine itself.

If the rate of feed of this compressor is adjusted in such manner as to complete, if necessary, the filling of the full cylinder volume, generated by pistons $b$ and $b^1$, the engine thus obtained shall have a ratio of expansion equal to the new ratio of compression, that is to say 11, if one start from the engine the clearance space of the combustion chamber of which is established for a ratio of compression equal to 6 when said ratio is calculated by supposing that the volume at the beginning of the compression stroke is equal to one half of the total maximum volume. In order to obtain this result, it will suffice to employ very small compressors, the cylinder being freely filled to an amount which is 75 or 80% of its total volume. But, in this case also, being given the small amount of air to be transferred between the cylinder and the regulating main, the density of the gaseous mass fed to the cylinder shall be accurately measured and shall be exactly the same for all the cylinders of a multi-cylinder engine. As the value of the ratio of compression is already rather high, it will be advantageous to make use of anti-knock fuels, in order to be able to utilize an ignition system producing a high tension electric spark, this being the only system capable of accurately ensuring ignition for all the cylinders of engines running at high speeds.

(C) In the case of a supercharged engine, the regulating main $f$ must also be wholly separated from the atmosphere or from the fresh air intake main $e$ by means of valve $r$, brought into the position shown by Fig. 1d and it must be fed through compressors working at a speed proportional to the speed of the engine, the output pressure of these compressors being slightly higher than in the preceding case, so as to increase the total amount of fresh air fed to the cylinder by say $\frac{1}{4}$.

The actual compression that is thus obtained can reach a value which is quite sufficient for ensuring the automatic ignition of the charge of fuel, injected by mechanical or gaseous atomizing into the combustion chamber.

The consumptions shall be slightly improved with respect to the second case, due to the increase of the compression and combustion pressures. The ratio of expansion still remains constant and, in the example that is considered, it is equal to 11, since nothing has been changed in the structural features of the engine. Even in this third case, the maximum output of the compressor that feeds the air for charging the cylinder does not reach one half of the total cylinder volume per cycle of the engine.

The same adjustment of the distribution and the same speeds may be maintained for working with high compressions.

Of course other distribution organs might be employed: slide-valves disposed inside the cylinder, double concentric slide-valves having a reciprocating or rotary movement, simple or double slide-valves having an oscillating movement, etc., without departing from the principle of the invention.

In a general manner, while I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A two-stroke internal combustion engine which comprises, in combination, a cylindrical element forming two opposed cylinders, provided with at least one air inlet port, and at least one outlet port, two pistons, movable in opposition in said cylindrical element, adapted to cooperate with said ports, respectively, means for feeding a charge of fuel into said cylindrical element, a regulating chamber adapted to contain air at a predetermined pressure, said cylindrical element being provided with at least one supplementary port adapted to communicate with said chamber, located in such manner as to be covered by one of said pistons after at least one half of the compression stroke thereof, valve means for controlling the communication between said supplementary port and said chamber, and driving means for operating said valve means in accordance with the relative movements and positions of said pistons in such manner as to close said auxiliary port only after it has been covered by said piston and to reopen it only at the beginning of the next compression stroke.

2. A two-stroke internal combustion engine which comprises, in combination, a cylindrical element forming two opposed cylinders, provided with at least one air inlet port and at least one outlet port, two pistons, movable in opposition in said cylindrical element, adapted to cooperate with said ports, respectively means for feeding a charge of fuel into said cylindrical element, a crankshaft for driving said pistons, a regulating chamber adapted to contain air at a predetermined pressure, said cylindrical element being provided with at least one supplementary port adapted to communicate with said chamber, located in such manner as to be covered by one of said pistons after at least one half of the compression stroke thereof, a cylindrical slide valve coaxially surrounding said cylindrical element on the outside thereof and out of the portion thereof that is provided with the outlet port adapted to control the communication between said supplementary port and said chamber, and driving means for reciprocating said slide valve directly from said crankshaft, at the same speed, with a predetermined lag with respect to the pistons, in such manner as to close said auxiliary port only after it has been covered by said piston and to reopen it only at the beginning of the next compression stroke.

3. A two-stroke internal combustion engine which comprises, in combination, a plurality of cylindrical elements forming each two opposed cylinders, provided with at least one air inlet port and at least one outlet port, two pistons, movable in opposition in each of said cylindrical elements, adapted to cooperate with said ports, respectively means for feeding a charge of fuel into each of said cylindrical elements, a common regulating chamber adapted to contain air at a predetermined pressure, each of said cylindrical elements being provided with at least one supplementary port adapted to communicate with said chamber, located in such manner as to be covered by one of said pistons after at least one half of the compression stroke thereof, valve means for controlling the communication between the supplementary port of each cylindrical element and said chamber, and driving means for operating said valve means in accordance with the relative movements and positions of the corresponding pistons in such manner as to close each auxiliary port only after it has been covered by said piston and to reopen it only at the beginning of the next compression stroke.

FRANÇOIS ROCHEFORT.